J. H. LEHMAN.
ELECTRICAL CIRCUIT CONTROLLER.
APPLICATION FILED APR. 23, 1906.
1,054,219.
Patented Feb. 25, 1913.
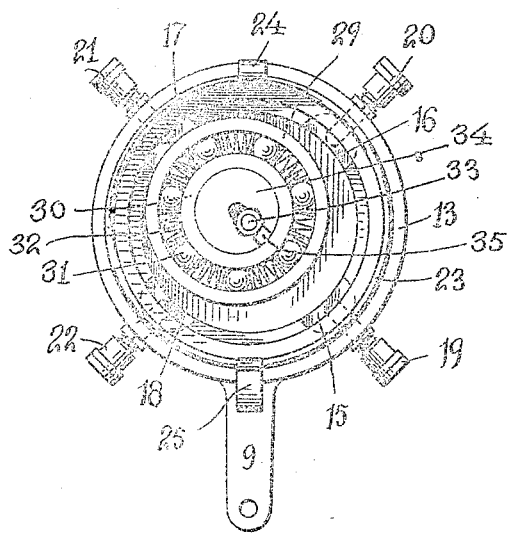
Fig. 1
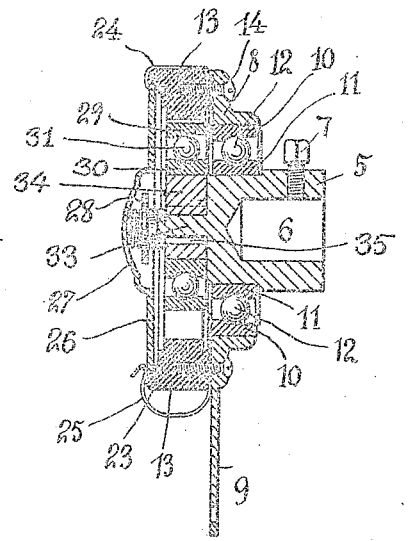
Fig. 2
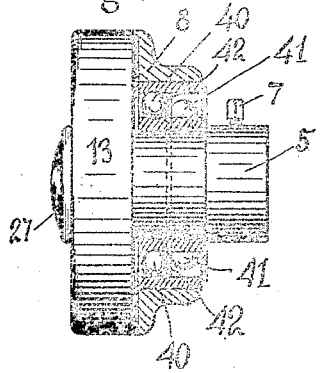
Fig. 5
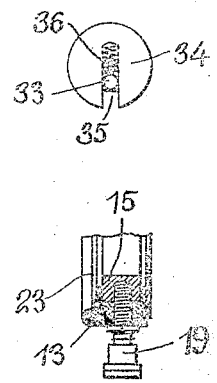
Fig. 3
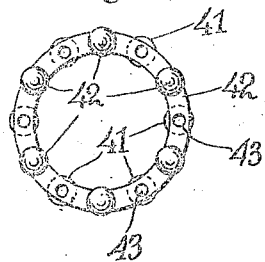
Fig. 6
Fig. 4

UNITED STATES PATENT OFFICE.

JOSEPH H. LEHMAN, OF NEW YORK, N. Y.

ELECTRICAL-CIRCUIT CONTROLLER.

1,054,219.    Specification of Letters Patent.    Patented Feb. 25, 1913.

Application filed April 23, 1908. Serial No. 428,871.

*To all whom it may concern:*

Be it known that I, JOSEPH H. LEHMAN, a citizen of the United States, residing in the city, county, and State of New York, have invented certain new and useful Improvements in Electrical-Circuit Controllers, of which the following is a specification, reference being had therein to the accompanying drawing.

My invention relates to improvements in electrical controllers, more particularly, it has reference to an apparatus adapted for use in the periodical making or breaking of an electrical circuit as required in sparking for explosion engines, etc.

Referring to the accompanying drawings Figure 1 is a plan view of my electric controller and Fig. 2 a transverse section of the same. Fig. 3 is a transverse section of part of one of the bearings and Fig. 4 is a broken section showing the construction and setting of one of the binding posts. Fig. 5 is a side elevation partly in section showing a modified form of ball bearing and Fig. 6 is a plan view of the modified form of ball bearing.

5 is the timer shaft or main bearing of the electric controller and is adapted to fit over the end of the engine shaft which enters the opening 6 and is bound therein by the set screw 7.

8 is the frame-work of the switching device provided with the extension 9 adapted to bind the frame-work at an angle upon the main bearing 5.

10 and 11 are concentric rings provided with ball bearings 12 facilitating the rotation of the main bearing 5 while the frame-work 8 of the switching device is held stationary. To this end the inner ring 11 is made fast to the main bearing 5 in any suitable manner and the outer ring 11 is similarly fastened to the frame-work 8 thereby facilitating a relative rotary movement between the main bearing and the frame-work of the device. In Figs. 5 and 6 a modification of this bearing is shown and comprises a staggered arrangement of a double set of balls providing a much firmer bearing and provided with an intervening ring or partition 42 adapted to keep the balls 40 and 41 in position. Upon the frame-work 8 is also mounted a heavy ring of suitable insulating material 13 fastened to the frame-work of the device by any suitable means such as the screw 14. The ring 13 is provided with four metallic segments 15, 16, 17 and 18 suitably fastened therein which are provided with binding posts 19, 20, 21 and 22 respectively. 23 is a ring or tubing of rubber or other resilient material adapted to set in the face of the insulating material 13 as shown. 24 and 25 are spring clamping attachments adapted to engage the cover 26 which may be snapped on to the face of the controller as shown in Fig. 2. The cover 26 is preferably provided with a central cavity or dome 27 provided with a spring inforced cap 28 adapted to bear against the end of the main bearing 5 as shown. 29 and 30 are concentric rings similar to the rings 11 and 12 and are also provided with the ball bearings 31. Between these ball bearings spiral springs may also be provided as shown at 32 in Fig. 1 providing what is generally known as the annular rim type of ball bearing. The projection 33 of the main bearing 5 is elongated in cross section thereby providing a key to engage the bearing 34 upon which is mounted the inner ring 30 of the ball bearing which is free to turn independently of the outer ring 29. By this arrangement it will be observed that when the casing 8 is adjusted by the extension 9 and fixed in a permanent position the main bearing 5 may be set in rotation by the shaft of the engine and revolve freely upon the ball bearings 12. While this is going on it will also be observed that the elongated projection 33 of the main bearing 5 carries with it in its rotation the bearing 34 provided with the elongated opening 35 and provided with the spiral spring 36 adapted to constantly force the bearing 34 out of center and as a natural consequence throw out of center the rings 29 and 30 provided with the ball bearings 31. In this way upon every revolution of the main bearing 5 the outer ring 29 or rolling contacting device of the ball bearing rolls in successive contact with each of the segments 15, 16, 17 and 18 and is so proportioned that the contact with each segment is broken before contact with the preceding segment is instituted, so that it will be seen that by using the main bearing or the cover of the device as a ground the current will flow from the cover or main bearing through the inner ring 30, ball bearings 31 and outer ring 29, through each segment as passed and from there into its binding post, through the sparking apparatus and back to the ground.

Various modifications may be made without departing from the spirit of the invention.

Having described the invention, what I claim as new, and desire to secure by Letters Patent, is:

1. In a circuit controller, a casing member and an axial member, each of said members being adapted to be connected to an electric circuit, a rolling contacting device resiliently and eccentrically mounted upon one of said members, said contacting device being adapted to electrically connect said members during each revolution of one of said members, said rolling contacting device comprising eccentrically mounted concentric rings.

2. In a circuit controller, a casing member and an axial member, each of said members being adapted to be connected to an electric circuit, a rolling contacting device eccentrically mounted upon one of said members, said contacting device being adapted to electrically connect said members during each revolution of one of said members, said rolling contacting device comprising eccentrically mounted concentric rings, and balls separated by springs between said rings.

In testimony whereof I affix my signature in presence of two witnesses.

JOSEPH H. LEHMAN.

Witnesses:
P. H. J. DALY,
THOMAS A. HILL.